US009210361B2

(12) United States Patent
Todd

(10) Patent No.: US 9,210,361 B2
(45) Date of Patent: Dec. 8, 2015

(54) VIDEO DISPLAY SYSTEM

(75) Inventor: Marc Todd, Foxboro, MA (US)

(73) Assignee: Skreens Entertainment Technologies, Inc., Foxboro, MA (US)

( * ) Notice: Subject to any disclaimer, the term of this patent is extended or adjusted under 35 U.S.C. 154(b) by 0 days.

(21) Appl. No.: 13/454,610

(22) Filed: Apr. 24, 2012

(65) Prior Publication Data

US 2013/0278828 A1    Oct. 24, 2013

(51) Int. Cl.
*H04N 7/173* (2011.01)
*H04N 5/445* (2011.01)
*H04N 5/45* (2011.01)
*H04N 21/431* (2011.01)
*H04N 21/2343* (2011.01)
*H04N 21/2665* (2011.01)
(Continued)

(52) U.S. Cl.
CPC ............ *H04N 5/45* (2013.01); *H04N 21/2343* (2013.01); *H04N 21/25875* (2013.01); *H04N 21/2665* (2013.01); *H04N 21/4312* (2013.01); *H04N 21/4438* (2013.01); *H04N 21/440272* (2013.01); *H04N 21/454* (2013.01); *H04N 21/4532* (2013.01); *H04N 21/4622* (2013.01); *H04N 21/4753* (2013.01); *H04N 21/4788* (2013.01); *H04N 21/482* (2013.01); *H04N 21/4858* (2013.01); *H04N 21/6587* (2013.01); *H04N 21/812* (2013.01); *H04N 21/21805* (2013.01); *H04N 21/4781* (2013.01); *H04N 21/4786* (2013.01)

(58) Field of Classification Search
USPC .................................. 725/109; 348/564, 565
See application file for complete search history.

(56) References Cited

U.S. PATENT DOCUMENTS 6,166,736 A  * 12/2000 Hugh .................... G06F 3/0481
                                                    715/777
6,931,660 B1 *  8/2005 Kalluri ............... H04N 7/17336
                                                    348/E5.006
(Continued)

FOREIGN PATENT DOCUMENTS

WO        2013163291 A1    10/2013
WO        2015/031802 A1    3/2015

OTHER PUBLICATIONS

PCT/US13/37983, "International Application Serial No. PCT/US13/37983, International Search Report and Written Opinion mailed Jun. 19, 2013", 12 pages.
(Continued)

*Primary Examiner* — Pinkal R Chokshi
*Assistant Examiner* — Alexander Gee
(74) *Attorney, Agent, or Firm* — GTC Law Group LLP & Affiliates

(57) ABSTRACT

The present disclosure relates to a system for multiplexing (i.e. combining multiple signals into one signal) both a plurality of video content (live and deferred time) and multiple video access mediums (such as cable television, satellite, internet video (clips, programming and movies), video games, DVD players, etc.) in a viewer friendly manner to enhance entertainment and other entertainment possibilities. The output of a selected video content is seen in a container known as a video container. Multiple video containers can be resized and positioned on a large screen television or other display device under viewer control. Control of video containers' video content or other content viewed, audio, and a host of other properties are done via web page controls or preferably connected mobile devices such as smart phones, tablets or other devices.

32 Claims, 8 Drawing Sheets

(51) Int. Cl.

| | |
|---|---|
| *H04N 21/45* | (2011.01) |
| *H04N 21/454* | (2011.01) |
| *H04N 21/462* | (2011.01) |
| *H04N 21/475* | (2011.01) |
| *H04N 21/4788* | (2011.01) |
| *H04N 21/482* | (2011.01) |
| *H04N 21/485* | (2011.01) |
| *H04N 21/6587* | (2011.01) |
| *H04N 21/81* | (2011.01) |
| *H04N 21/258* | (2011.01) |
| *H04N 21/4402* | (2011.01) |
| *H04N 21/443* | (2011.01) |
| *H04N 21/218* | (2011.01) |
| *H04N 21/478* | (2011.01) |
| *H04N 21/4786* | (2011.01) |

(56) References Cited

U.S. PATENT DOCUMENTS

| | | | | |
|---|---|---|---|---|
| 7,373,414 | B2 * | 5/2008 | Evron | G06F 17/30017 345/1.3 |
| 8,327,277 | B2 * | 12/2012 | Thakkar et al. | 715/753 |
| 8,386,304 | B2 * | 2/2013 | Chen | G06Q 20/102 705/14.71 |
| 2007/0024705 | A1 * | 2/2007 | Richter et al. | 348/142 |
| 2007/0252912 | A1 | 11/2007 | Valente et al. | |
| 2008/0010654 | A1 * | 1/2008 | Barrett | H04N 7/163 725/32 |
| 2008/0244641 | A1 * | 10/2008 | Ho | H04N 5/50 725/35 |
| 2009/0210491 | A1 * | 8/2009 | Thakkar | H04L 12/1822 709/204 |
| 2010/0066677 | A1 * | 3/2010 | Garrett | G06F 1/1626 345/163 |
| 2010/0088634 | A1 * | 4/2010 | Tsuruta et al. | 715/800 |
| 2010/0333044 | A1 * | 12/2010 | Kethireddy | G06F 3/0481 715/863 |
| 2011/0004839 | A1 | 1/2011 | Cha et al. | |
| 2011/0126255 | A1 * | 5/2011 | Perlman | A63F 13/12 725/116 |
| 2011/0179436 | A1 * | 7/2011 | Candelore | 725/25 |
| 2011/0310221 | A1 * | 12/2011 | Meuninck | H04N 13/0436 348/43 |
| 2012/0151535 | A1 * | 6/2012 | Ramdeo | H04N 21/4782 725/62 |
| 2012/0210350 | A1 * | 8/2012 | McCoy et al. | 725/34 |
| 2012/0317598 | A1 | 12/2012 | Gilson | |
| 2013/0125171 | A1 | 5/2013 | Sharif-Ahmadi et al. | |

OTHER PUBLICATIONS

PCT/US2014/053491, "International Application Serial No. PCT/US2014/053491, International Search Report and Written Opinion mailed Dec. 9, 2014", Skreens Entertainment Technologies, Inc., 15 Pages.

PCT/US2013/037983, "International Application Serial No. PCT/US2013/037983, International Preliminary Report on Patentability With Written Opinion mailed Nov. 6, 2014", Skreens Entertainment Technologies, Inc, 10 Pages.

* cited by examiner

VIDEO DISPLAY SYSTEM

FIELD OF THE INVENTION

The present disclosure relates generally to the field of video and audio content control and display. More specifically, the present disclosure is related to a video container system configured for multiplexing a plurality of video sources and a plurality of video content into flexible, controllable containers called video containers that are displayed on televisions or other display devices for enhanced entertainment and entertainment possibilities.

BACKGROUND

Traditionally, television entertainment has been understood to be one program being displayed on a television or display device like a personal computer (PC) or mobile device. For example, a viewer may watch a movie on a large screen television that is being aired on a television network. The viewer "tunes into" the network by changing television station or setting cable box to the network channel. The program is output out of the set top box or other device and displayed on the television with audio. If the viewer wants to see what is on another network, he changes the channel on the cable box (or other) and after a moment the television displays what is being transmitted that network.

Advertising and program structure is set up to break up the content of the movie to place other video messages, such as product advertisement, local advertisement, channel advertisement, government emergency message, and the like. The viewer watches through the interruption of the movie content and sees the advertisement or other unless the user changes the channel while the movie is at break.

This advertising and single channel viewing set up causes the behavior of the viewer with the control of the television to start "channel changing" or "flipping" or "channel surfing". Other causes of hyper channel changing are when a viewer wants to see other live events on other channels, slow or boring section in the video content stream, and a host of other reasons. Ultimately "channel surfing" is viewer experience driven in their efforts to maximize entertainment or information from the television. This behavior often results in the viewer with the television control being the only person to be able to watch or enjoy the television, often the family or those in the household or group watching the television will disband to separate display devices to "surf" to the video content of their choice, often exhibiting the same behavior.

Television viewing, and especially large screen flat panel television viewing set up is done by hooking all video input devices, such as DVD, cable box, satellite box, video game console, over the top video from the internet (OTT) box, and other inputs to the television. Then, by use of a select input button on the television, the viewer selects the video input device that takes control of the whole television picture. In some models the television allows a "picture in picture" mode where video from two devices can be displayed at one time with one small and one large. This mode offers a bit of control, but not enough to satisfy most users.

The evolving changes in viewer sophistication, especially technical sophistication, combined with significantly increased access to video content has outpaced the ability of the current television viewing and control model. To complicate the picture, often while the viewer is doing all this flipping and surfing, he/she is also on a PC, laptop or mobile device to operate applications connected to the internet for further experience.

The entertainment industry including content creators, content providers, service providers, television manufacturers, advertisers and internet companies are all currently limited in the ability to present a combined, easy to use and expandable television presentation that is outside their scope. Therefore, what is needed is a system that considers all these combined interests and creates a new user experience framework for television viewers.

SUMMARY

The systems and methods contemplated herein allow for a new generation of entertainment possibility by decoupling the limitation of the video input sources that take control of the entire television screen for single video picture viewer experience. While "picture in picture" is a feature that allows viewing of two video contents on the same television it is too limited, because there is no ability to multiplex input from more than one video input source (i.e. a cable box and video game console, for example). Moreover, picture in picture does not provide the flexibility required to expand the entertainment potential. The systems and methods herein also enable the proper integration of the internet and video content. Further, this invention may allow the content creator, distributor, and/or owner to directly engage with the end viewer via internet access over an internet video container at the same time the video content is broadcast. This engagement provides a new infrastructure for new ideas to enhance entertainment, social interaction, advertisements, point of sale, and other benefits for the industry.

In a first embodiment, a system for multiplexing both a plurality of video content (live and/or deferred time) and multiple video access mediums (such as cable television, satellite, video games, DVD players, closed circuit video, internet video such as clips, programming and movies, and the like.) The system achieves this in a viewer friendly manner to enhance entertainment and other entertainment possibilities. The output of a selected video content is seen in a container referred to herein as a video container. This video container does not necessarily need to fill an entire screen of a display device. A plurality of video containers may be displayed on a television or other display device simultaneously.

The system may include one or more inputs with access to one or more video programs. The video programs or video content may be live linear content such as broadcast television, cable/satellite stations, and others. The video content may also be video on demand content such as movies that get delivered on command from a viewer. The video content could also be delivered over the internet or streaming video. Any video source that can be displayed on a viewing screen including video conferencing and security video could be inputs to the system. Additionally any entertainment media that could be displayed in or on an entertainment device, such as a PC, mobile device or television, could be a video content input; including digital radio, web page interaction, video game input and output and others.

The video container is a logical container that is displayed on the television screen, and is the area where a particular video is played out and viewed. In many embodiments, the video container may be substantially rectangular in shape to match the video content aspect ratios, though the video container may be any shape. The video play out does not exceed the boundary of the video container. In some embodiments, the video container may be sized and resized, in near real-time to form different size bounding rectangles from small to as large as the screen of the display device. Preferably, the video picture may scale to fit the bounding rectangle of the video container. Moreover, in some embodiments, the video container may be positioned and repositioned in near real-time to put the frame of the rectangle in viewer selectable position on the television screen.

The video container may also have many properties that include but are not limited to: video container type (global video container, sports video container, movie video container, or web video container, etc.), a content filter, a list of channels with location, point of sale data (like credit card info), permissions for viewer log-in, and others. These properties allow particular video containers to be programmed with properties, and repeatedly accessed, which may enhance a user experience.

In one embodiment, the properties of the video container may allow a viewer to confine and control content type in a particular video container which may enhance ease of use. For example, instead of "surfing" though an entire channel guide to find any sporting events, a video container could be configured with a filter to display only live sporting events across all input services. In another example, a video container may be configured to show only network news programming. In these embodiments, video container configurations may allow the viewer to quickly view all sports or news programs to find one of interest.

Video containers are independent from each other. Therefore, multiple video containers can be sized and positioned by a viewer for better entertainment experience. For example, suppose a viewer wanted to watch a football game, two baseball games, and the news at the same time. The viewer could launch the appropriate video containers for each of the four desired programs, resize and position each in accordance to his needs.

The system contemplated herein may also be configured to allow multiple people to privately listen to an audio of the video container of interest on the television while others watching the same television or other video display can listen to audio from different video containers. In one embodiment, the multiple audio outputs are transmitted via streaming mechanism from the video containers system to mobile devices over communications networks that are connected to the system, as well as private headsets. In one embodiment of operation, different video containers may provide a particular, identifiable audio output channel. A user having a personal headset may connect the headset to an audio device in electronic communication with the system. The audio device may be configured to change channels to provide access to the identifiable audio output channels of each video container. In this way a user may easily access the audio channels of the various video containers. Audio devices may include, but are not limited to computers, cellular phones, devices specifically configured for the present invention, televisions, video game consoles, and the like.

The system contemplated herein may further comprise a video camera, and may be enabled to provide a video conferencing service allowing video communication between two or more users. In one embodiment, the video conferencing service may allow a plurality of users to watch a live broadcast and discuss the broadcast using the video conference system. The video conferencing system may be between two users, or may be between three or more users. In still another embodiment, a security camera feed may be displayed in a video container. In further embodiments utilizing social interaction aspects, a first user may send a video container from his display device to a display device of a second user, allowing the second user to view what the first user is viewing on the sent video container. This feature may be tied into packages such as the video conferencing service.

In one embodiment, properties of a screen may be manipulated by a network computing device. The network computing device is defined broadly herein to include computing devices connected to a network, as well as other input devices such as a remote control, PCs with web page access to a web interface to the video container system, body and/or hand motion devices, voice command devices and other control input devices that can be connected to video container system. In one embodiment, the system may be enabled to bring a video container into full screen mode upon command, and may return to a view showing multiple video containers upon command. In another embodiment, the video container system may be configured to have one large video container displayed, and a number of smaller video containers displayed on the same display device. In this embodiment, the system may be configured to allow a video on a smaller video container to be switched with a video on the large video container on command.

Video containers may have many properties to control the bounds of the function the video containers. One such property is the display type. A video container can be a video display type that provides video play out features and functions. Other display types are possible, one such type is an internet type. The internet video container provides the same sizing and position capability but instead of video playout it can perform web based application functions for example: HTML, Java Script, Java applets, etc. This allows a programmable application to be hosted on the internet and to be executed in the internet video container.

For example if a viewer wants to have a video container for all news channels. The video container may have a list of news channels like CNN®, Foxnews®, etc. and would not display or consider other stations like the Disney® Channel because that is not news. The property of the video container may receive video programming across a variety of sources, so for example the news channels may come in through a cable source, a satellite dish source, and an internet source. All of these sources that provide news programming may (or may not-depending on the properties) be displayed in the video container. Another example is a video container is configured to list the top 20 most popular video clips on the internet for the current day. Each time launched the list is refreshed by video containers to find the top clip links for that day.

In one embodiment, a video container and content can be streamed, both audio and video, to a mobile device, PC or other display device. In this embodiment, the video content system may be configured as an integrated video access system providing video access to a plurality of devices simultaneously.

In another embodiment, a single video container system may be operative with a plurality of display devices, the system providing a plurality of different video containers to the different display devices. In a further embodiment, a single control device may control the video container content and layout on all of the plurality of display devices, and may allow transfer of one video container from one display device to another. In one example, a single video container system may be employed at a bar having five large screen televisions. A single control device may control all of the video containers displayed on each of the five televisions. Further, this control device may allow transfer of a video container from a first television to a second television. In a further embodiment, the system may allow the five televisions to act as a single large display and may allow movement of video containers as if the televisions were a single display.

The video container system structure also provides many opportunities to expand advertising strategy and function. Control of video container playout and placement may allow spare television screen space for advertisement. Further, interactive Web video containers may allow direct viewer input for advertisement acknowledgement, purchase of items, point of sale, opinion input and more. Moreover, video or text advertisements may be downloaded during video streaming and displayed in various video containers at different times based on criteria and available display space and video container space. In one embodiment an advertising module may be in communication with the system. The advertising module may provide a video content to the system specifically for advertisements. In further embodiments, a particular video container may be dedicated to the advertising module video content.

The video container system has an optional connection over internet to a video container web site where the viewer can login and setup an account to control features of the video containers system. Features may include ability to choose if viewer analytics can be collected and sent to the web account for use for dynamic advertising strategies and other uses. In one embodiment, the viewer analytics may be stored in a data storage module to store viewer data for access by a service provider. This connection from a video container system to a computer in the network also provides the structure to enable social interaction with friends in real-time, views of what friends are watching, what is popular programming from a group of social system users, and sharing of video container settings including lists of popular video content channels from distributed sources.

DETAILED DESCRIPTION

In this disclosure, the term "video content" is used consistently with its use by those skilled in the entertainment technology to refer to video and optional audio programming regardless of transport, encryption or other mechanisms that relate to how the video content is distributed or protected. For example, a movie is video content such as a news broadcast, internet video clip, video conferencing, or video from a security camera. Moreover, the terms "video" and "video content" are defined broadly to additionally apply to internet browsing such as web page viewing and other internet applications, email viewing, closed circuit video, security camera video, and other displayable and/or interactive content. The term "computer" is meant to encompass a workstation, personal computer, personal digital assistant (PDA), wireless telephone, or any other suitable computing device. Terms such as "component(s)," "device(s)" and the like are intended to refer to computer related entity, either hardware, a combination of hardware and software, software or software execution. For example, a component may be, but is not limited to being, a process running on a processor, a processor, an object, a reconfigurable hardware object, an executable, a thread of execution, a program and a computer. By way of illustration, both an application running on a server and the server (or control related devices) can be components. One or more components may reside within a process and/or thread of execution and a component may be localized on one computer and/or distributed between two or more computers or control devices.

The term "near real-time" refers to sensing, detecting, capturing and/or responding to external events nearly simultaneously (e.g. within microseconds or a few seconds) with their occurrence, or sufficiently fast to meet the expectations of the viewer, such as change a channel and view the new channel video content.

Systems and methods embodying the present invention can be programmed in any suitable language and technology, such as Hypertext Markup Language (HTML), Active ServerPages (ASP) and Javascript. Alternative versions maybe developed using other programming languages including but not limited to; C++, Visual Basic, Java, VHDL, other reconfigurable hardware computer languages, VBScript, Jscript, BCMAscript, XML and/or CGI. Any suitable database technology can be employed, such as: Microsoft Access, Oracle Databases and the like.

Figure 1:
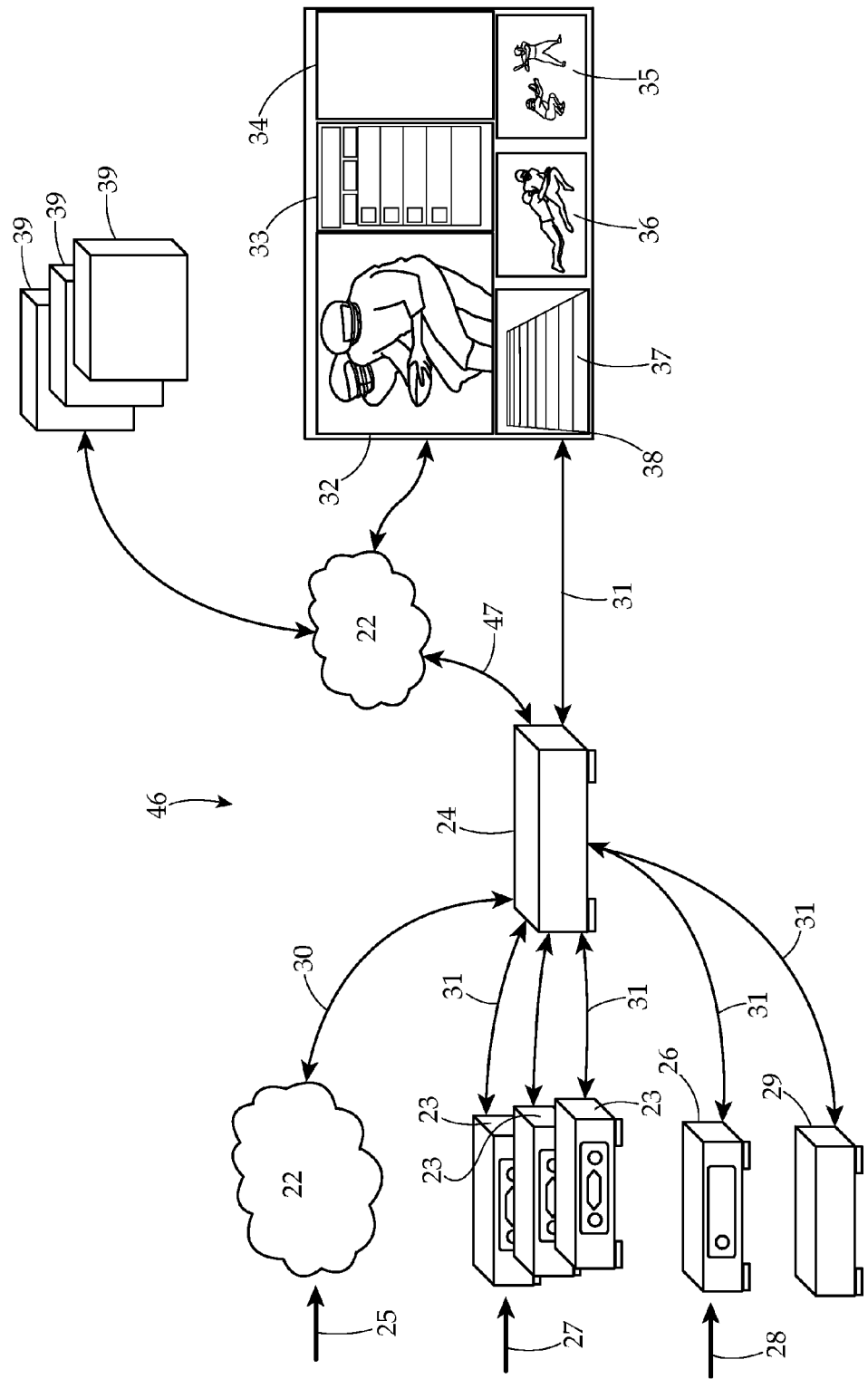
FIG. 1 is a schematic view of an embodiment of the video containers system.

Turning now to FIG. 1, an embodiment of the present invention includes a video container system 46 for presenting multiple views of video content or other entertainment that can be displayed on a television 38 or other display device and presented to one or more viewers. A media processing unit 24 is configured as a software program that runs on a computer and the corresponding hardware. The media processing unit 24 takes in video content and other media and produces a video signal that a television 38 or other display device can play for viewer. Video source 25 can be acquired from communications networks over Internet protocol (IP) (or other network protocol), over HDMI cable 31, or other output of a Set Top Box 23 receiving video content 27 from a service provider, DVD 29, video game console 29, internet video device 26 (connected to IP network to Internet 28), or other device and/or other transport mechanism to get video content. The media processing unit 24 controls the access to the video content by a variety of channel or content select mechanisms including but not limited to HDMI channel change commands over HDMI cable 31, Multicast IP leave/join over communications network 30 and other.

The media processing unit 24 takes commands from the viewer or viewers using network computing devices 39 (like an iPad, iPhone, PC, traditional remote control, or others). The network computing devices 39 are in communication with the controller 24 via a communications network 22.

Examples of such commands may be instructions to resize, position, select content, manipulate video container properties, manipulate web content in video container and other control functions. Those commands determine how the video containers system will select content and present video and audio to the viewer via the output to the television 38 and/or other display device (which could optionally be the control device 39). The output to the television or other display device can be a plurality of mechanisms including but not limited to HMDI cable 38, communications network 47, 22 and/or others. The video containers controller 24 can also re-encode video to reformat for many different display devices and formats for transport from the media processing unit 24 to the display device including a television 38 or the network computing devices 39. These formats may include but are not limited to linear broadcast transport stream over IP, file transfer, streaming (also known as over the top video (OTT)) or other. Each video container 32, 33, 34, 37, 36 or 35 displayed on the television 38 and/or other display device contains the video content determined from the commands issued by viewer via the network computing device 34. Each video container 32, 33, 34, 37, 36 or 35, displays content based on properties set, such as video as in 32, 36 and 35, video game from video game console 29 displayed in video container 37 and internet web page or bi-directional application interfaces, as displayed in video containers 33 and 34.

Figure 2:
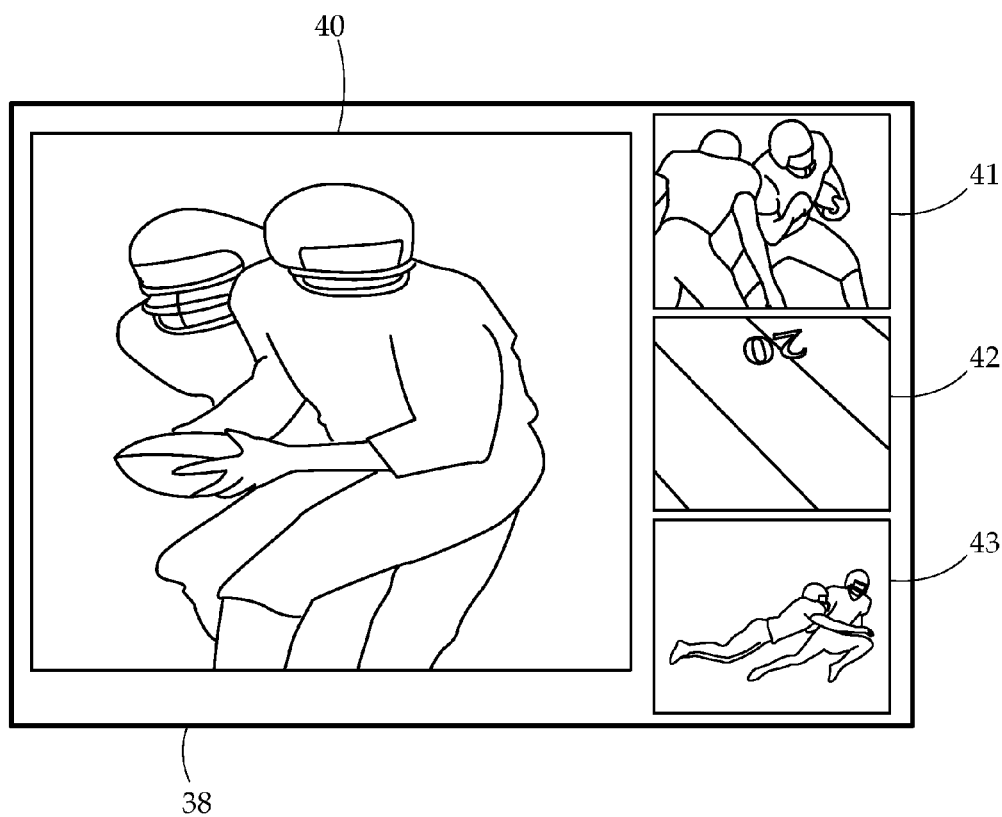
FIG. 2 provides an embodiment of the video container system configured specifically to have four video containers.

FIG. 2 shows an embodiment of video containers configured specifically to have four video containers 43, 42, 41, 40 on a television 38. Video container 40 has a larger size and is positioned on the left side of the television 38. Three smaller video containers 41, 42 and 43 are positioned on a right side of the screen and each show different television channel video content. Video container 40 may have its own properties configured by the user as to what to watch, from which source, etc. In the embodiment shown, video container 40 is showing a particular sporting event. Other sporting events taking place at the same time are shown in video containers 41, 42 and 43. In some embodiments, alternate camera views of the same sporting event may be shown in the smaller video containers 41, 42, 43, thereby providing multiple viewpoints of the sporting event. Alternate camera views may further be employed with other video such as live television content, enhanced movies, and programming configured to present multiple camera views, among others.

Figure 3:
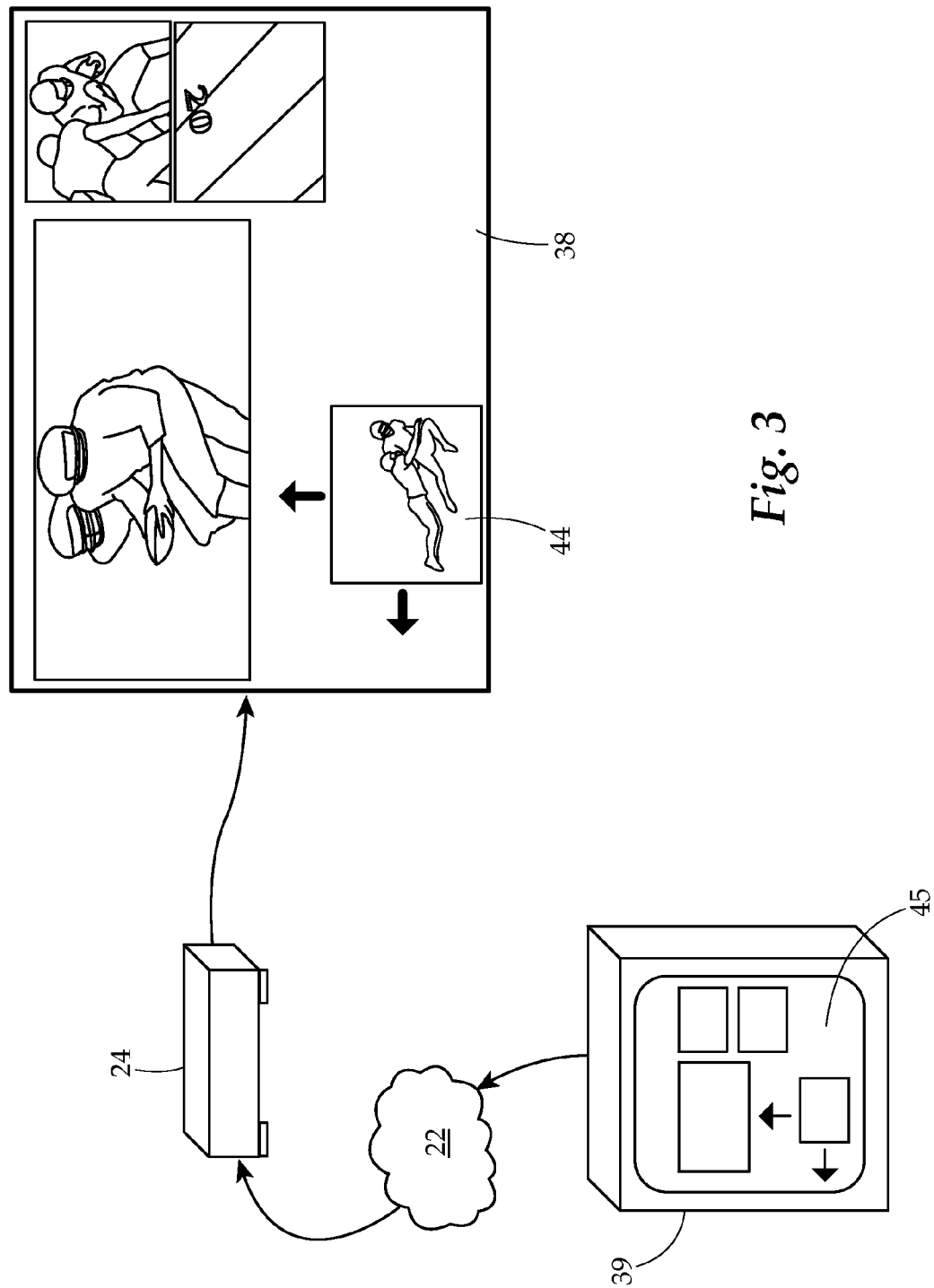
FIG. 3 provides a logical representation of how a video container can be resized and positioned on a television or other display device.

FIG. 3 shows an embodiment of a logical representation of a video container 44 being resized and positioned on a television 38. The network computing device 39 displays the video container bounding box rectangle. The user interface on the mobile or PC device 39 allows the viewer or user to resize the box 45 shown on the network computing device 39, then transmits a command over a communications network 22 to the media processing unit 24. The media processing unit 24 then changes the size and position of the video container 44 and matches the video container representation 45 on the television or display device 38. In one embodiment, the network computing device 39 may have a touch screen interface. In this embodiment, a user may utilize the touch screen interface to move the video containers on the display device 38. For example, a user may "pinch" a representation of one video container on the display device 38 to make it smaller. Similarly, a user may touch and "drag" a representation of a video container on the display device 38 to move it across the display device 38.

Figure 4:
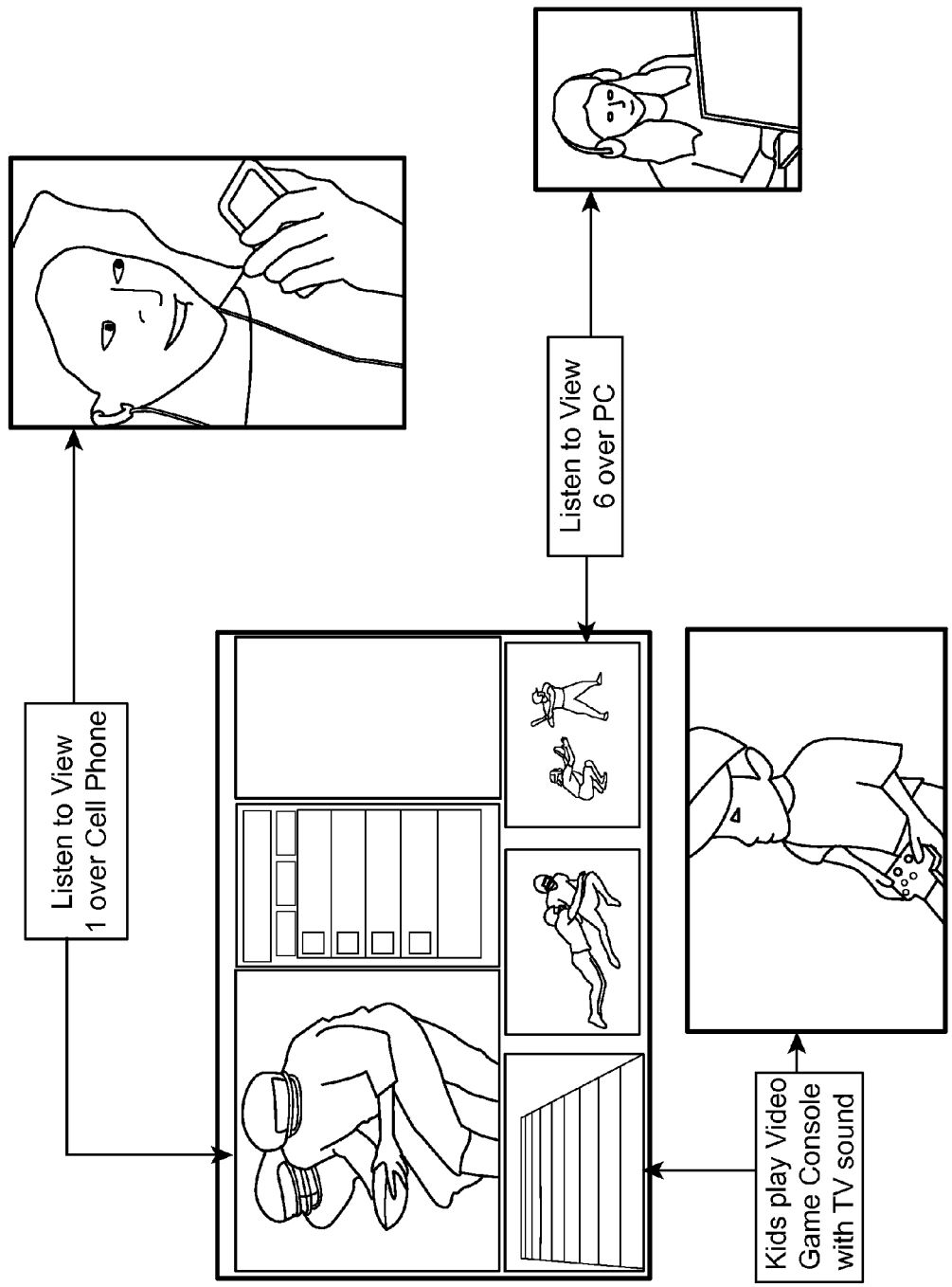
FIG. 4 provides a logical representation of how the video container system allows one or more mobile devices to connect to the system and select an audio of a particular video container on the display device.

FIG. 4 shows a logical representation of an embodiment of the system allowing one or more mobile and/or PC devices to connect to the video containers system and receive an audio output corresponding to a particular video content. In this embodiment, a user may select a particular video container view on the television or display device. The video containers system can then stream the audio for that video container selected to the mobile or PC device that optionally can have a private audio headset. This may allow many people to listen to different video container content without hearing other video container content. The present embodiment shows a first user listening to view 1 over a cellular phone connected to a headset. A second user is listening to view 6 over a PC connected to a headset. A third user is playing a video game and listening to the sound from the television speakers.

Figure 5:
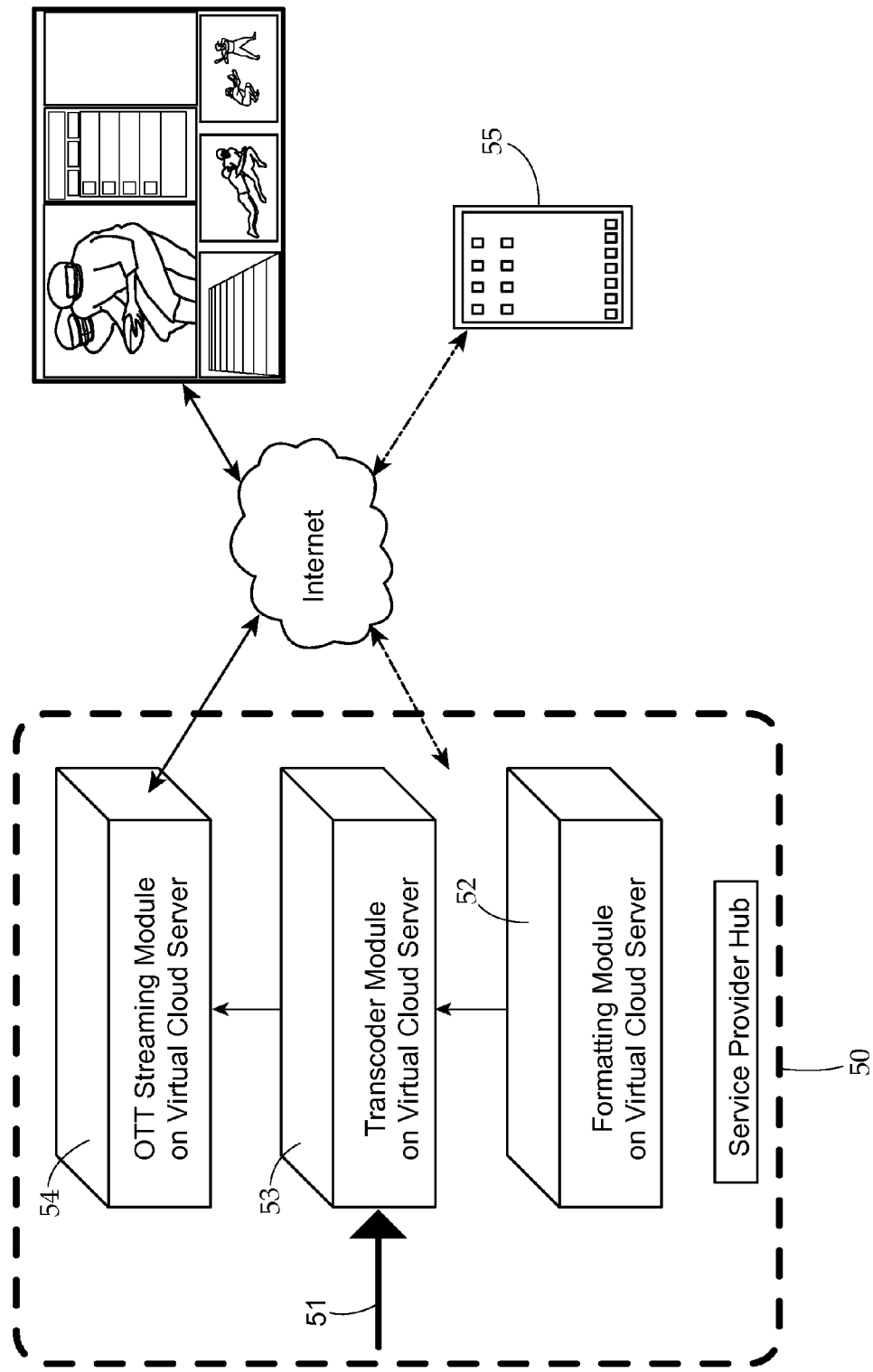
FIG. 5 provides an embodiment wherein the video container system is hosted by a remote server, which then provides video directly to a video device, such as a television or tablet computer.

FIG. 5 shows an embodiment wherein the video container system is hosted by a remote server or "cloud" which then provides video directly to a display device, such as a television or tablet computer. An offsite service provider hub 50 may receive input video content 51 from one or a plurality of sources. This video may be received into a transcoder module 53. A formatting module 52 may be in communication with the transcoder module 53. The formatting module 52 instructs the transcoder module 53 of what video streams to present, and what the proper format and presentation of video containers is. The transcoder module 53 then receives the video content and instructions and outputs video formatted in various video containers as desired by a remote user. An over the top (OTT) streaming module 54 receives the formatted video container data, and outputs the same in a streaming data output to the internet, or other data connection. An end user may then receive the formatted video over the internet on their television or other display device. Control of the formatting and video content of the video containers may be achieved by transmitting a signal from a controller 55, over the internet or communications network, to the formatting module 52, which will instruct the transcoder module 53 to change its output, as discussed above. This embodiment may allow centralized control of the system, and may require less hardware and setup for an end user.

Figure 6:
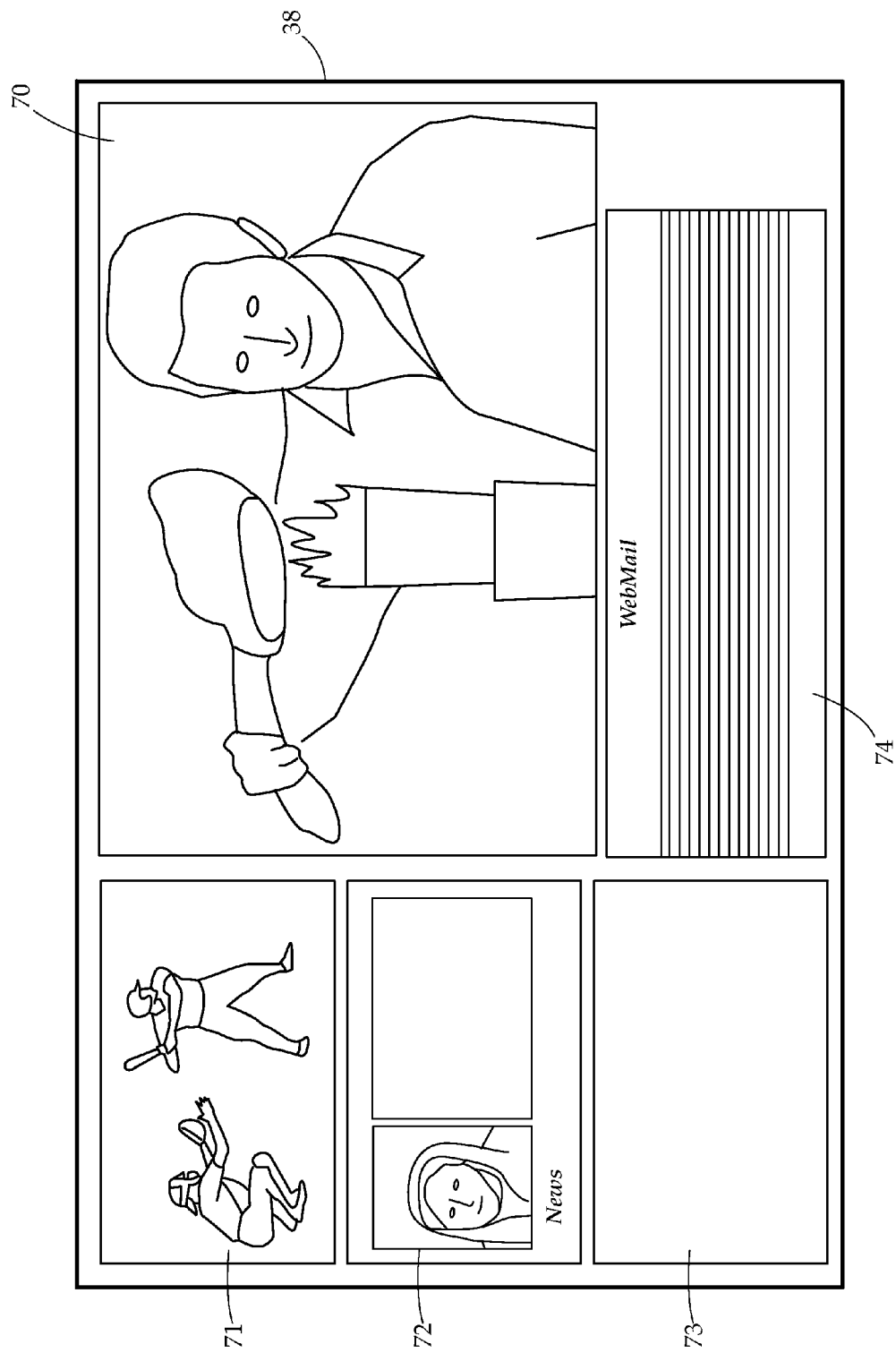
FIG. 6 provides an embodiment demonstrating a variety of video and internet video containers on a single display device—shown here as a television.

FIG. 6 provides an embodiment demonstrating a variety of video and internet video containers on a single display device—shown here as a television 38. A large video container 70 is positioned in an upper right corner of the television 38. The large video container 70 serves as the primary viewing area, and in this embodiment is showing a major network prime-time show. On a left side of the television 38 are three video containers 71, 72, 73, which are smaller than the large video container 70. A top video container 71 displays a sporting event video. A central video container 72 displays a news program, and a bottom video container 73 can be used for "channel surfing" for example to find a video for display in the large video container 70 during a commercial break. Further, at a bottom right portion of the television 38 is an internet video container 74. The internet video container 74 is shown accessing a webmail interface for checking email. This internet embodiment may allow a user to utilize a television as a single unit for internet usage and television viewing, as opposed to a user having multiple devices such as a laptop and television.

It should be noted that the arrangement, format and configuration of the various video containers 70, 71, 72, and 73 may be varied in any number of ways, and is limited only to the size and technical limitations of the display device.

Figure 7:
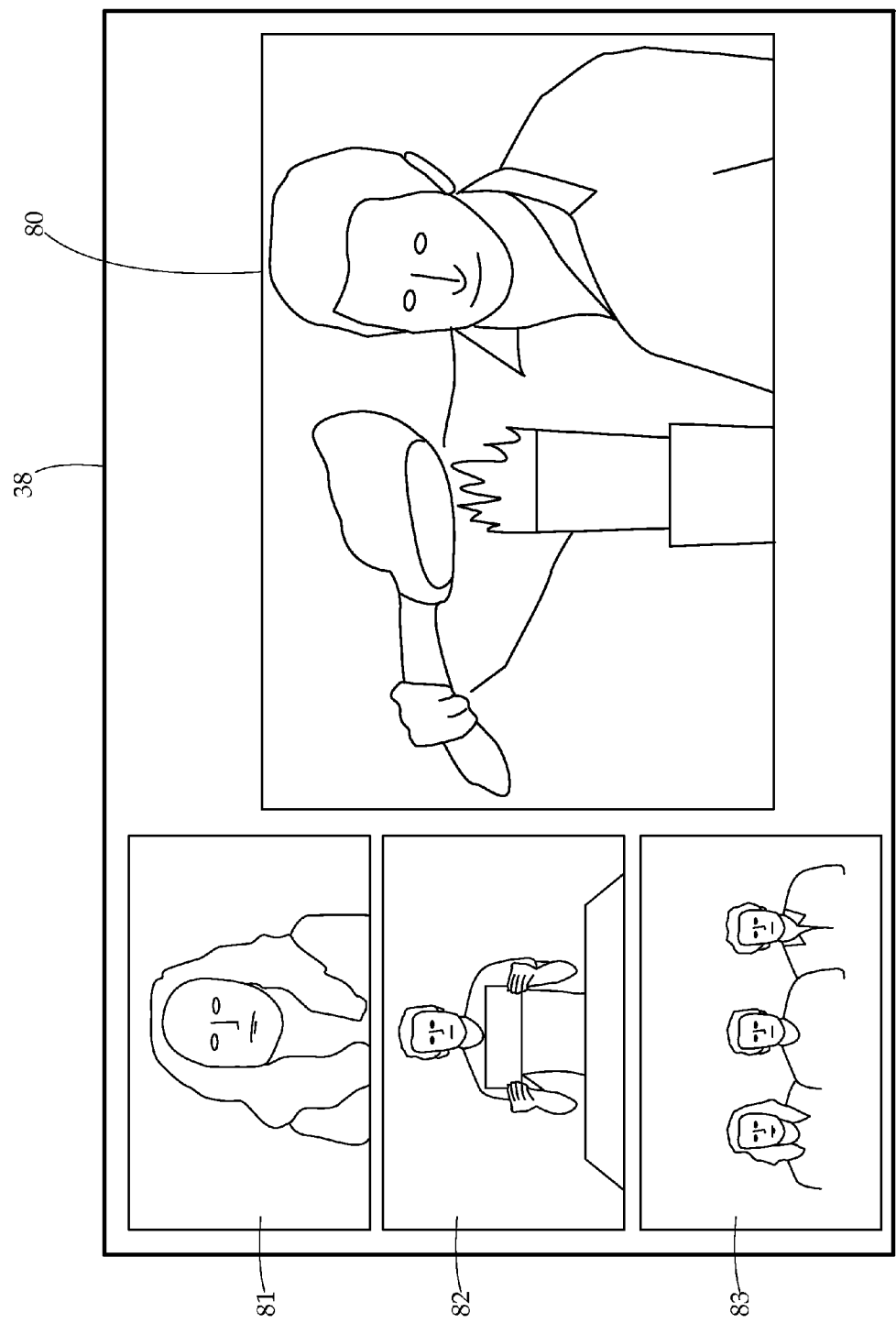
FIG. 7 provides another embodiment of the video container system having a plurality of video containers arranged on a display device—shown in this figure as a television.

FIG. 7 provides an embodiment of the video container system of a plurality of video containers arranged on a display device, shown in this figure as a television 38. The arrangement of FIG. 7 provides video containers all relating to the same program, but from different video sources. A large central video container 80 is positioned at a center right of the television 38. A video content of this video container is a main camera view(s) of a broadcast television show. Three smaller video containers 81, 82 and 83 are positioned at a left side of the television 38. A top video container 81 displays a video from the internet providing an alternative viewpoint from what is displayed on the main program in the central video container 80. In one embodiment, the video container 81 may display viewer video responses to a live broadcast in the central video container 80. A middle video container 82 displays a video displaying a further alternative viewpoint from what is displayed on the main program in the central video container 80. A bottom video container 83 displays a video displaying a further alternative viewpoint from what is displayed on the main program in the central video container 80. The content of the video containers 80, 81, 82, 83 may come from a variety of sources such as a cable feed, internet, satellite dish, pre-recorded content, and the like. Further, the source of the content in the smaller video container 81, 82, 83 may be different from the source of the content in the central video container 80.

Figure 8:
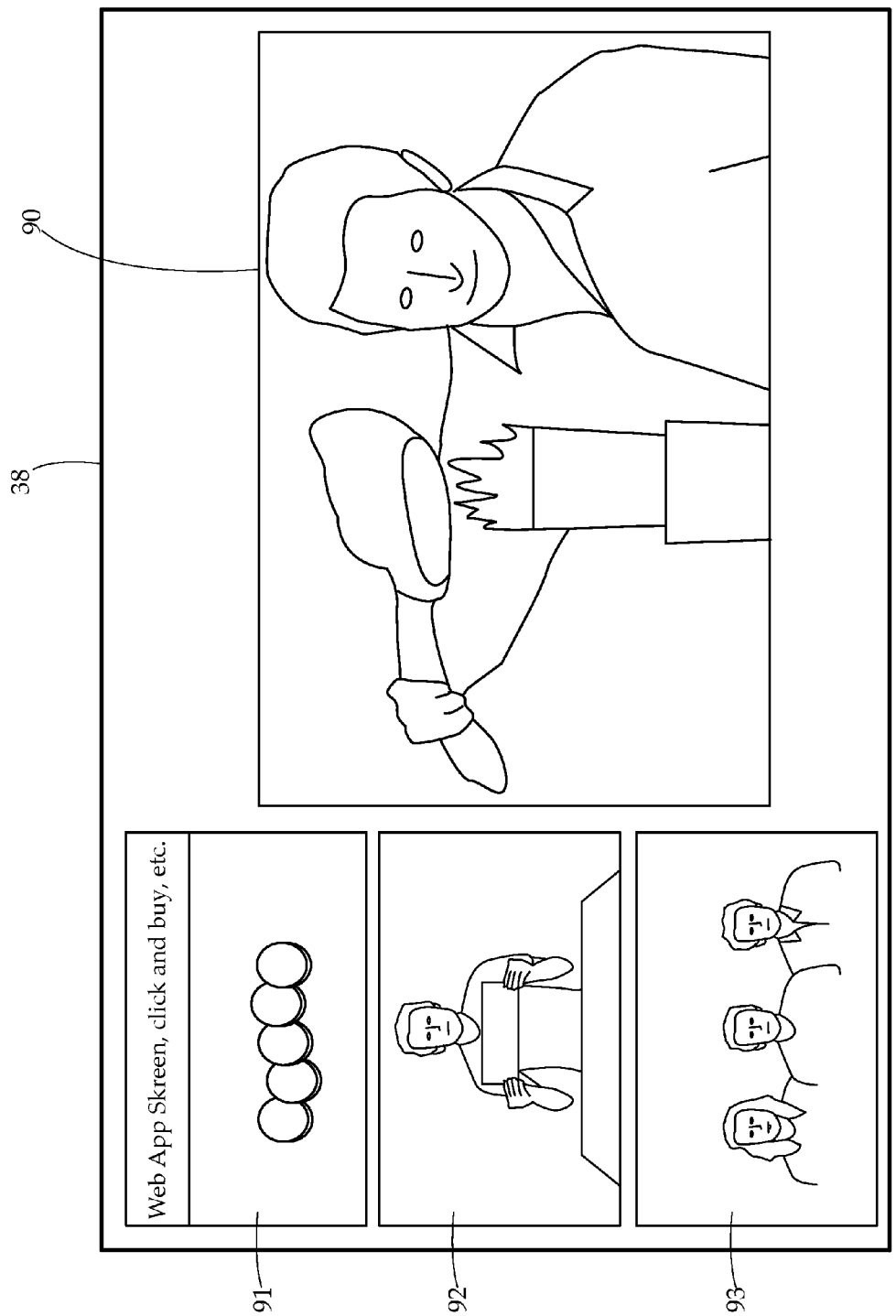
FIG. 8 provides still another embodiment of the video container system having a plurality of video containers arranged on a display device—shown in this figure as a television.

FIG. 8 provides an embodiment of the video container system of a plurality of video containers arranged on a display device, shown in this figure as a television 38. The arrangement of FIG. 8 provides video containers all relating to the same program, but from different video sources. A large central video container 90 is positioned at a center right of the television 38. A video content of this video container is a main camera view(s) of a broadcast television show. Three smaller video containers 91, 92 and 93 are positioned at a left side of the television 38. A top video container 91 displays an interactive internet interface. This interface may contain point of sale marketing, polling, voting, interactive gaming, and the like. A middle video container 92 displays a video displaying an alternative viewpoint from what is displayed on the main program in the central video container 90. A bottom video container 93 displays a video displaying a further alternative viewpoint from what is displayed on the main program in the central video container 90. The content of the video containers 90, 91, 92, 93 may come from a variety of sources such as a cable feed, internet, satellite dish, may be pre-recorded, and the like. Further, the source of the content in the smaller video container 91, 92, 93 may be different from the source of the content in the central video container 90.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A video display system comprising:
a computerized media processing unit configured to receive at least a plurality of content including at least one of video, audio, graphics, and internet content from a plurality of heterogeneous content sources providing such content, and configured to combine the plurality of content from the plurality of content sources to generate and output a single video signal receivable by a display device;
wherein the video signal output by the media processing unit comprises a plurality of video containers all displayable on the display device simultaneously with independently variable size and position under the control of a user, wherein each of the plurality of video containers is capable of simultaneously displaying video content independent of the size, position, and video content of the other of the plurality of video containers, and is capable of being sized without regard to an aspect ratio of the content received from the corresponding content source; and
a computing device separate from the display device and comprising at least one of a tablet computer and a smartphone in communication with the media processing unit, wherein the computing device has a touch screen interface that displays a representation of the plurality of video containers as arranged on the display device and which is configured to receive touch screen command inputs from a user to control, in near real time, the size, position, and access to the content of each of the plurality of video containers on the display device.

2. The video display system of claim 1 wherein the plurality of heterogeneous content sources comprises a non-video internet source and at least one of: an internet video source, a cable video source, a satellite video source, a DVD video source, a security camera video source, a video conferencing source, and a video game video source.

3. The video display system of claim 1 further comprising a plurality of audio devices, each in communication with the media processing unit, each of the plurality of audio devices configurable to select and provide an audio output of a video content from one of the plurality of video containers, the audio device capable of changing the audio output to correspond to any one of the plurality of video containers in near real-time.

4. A video container system comprising:
a display device;
a communications network;
a computerized media processing unit configured to receive at least a plurality of content selected from video, audio graphics, and internet content from a plurality of heterogeneous content sources comprising a non-video internet source and at least one of: an internet video source, a cable video source, a satellite video source, a DVD video source, a security camera video source, a video conferencing source, and a video game video source and configured to combine the plurality of content from the plurality of heterogeneous content sources to generate and output a single video signal receivable by a display device, the single video signal comprising a plurality of video containers all displayable on the display device simultaneously with variable size and position under the control of a user, wherein each of the plurality of video containers is capable of simultaneously displaying video content independent of the size, position, and the plurality of video content of the other of the plurality of video containers;
wherein each of the plurality of video containers is capable of being sized without regard to an aspect ratio of the content received from the corresponding content source; and
wherein the media processing unit comprises:
a transcoder module configured to receive the plurality of content from the heterogeneous sources and configured to output a formatted video signal;
a formatting module in communication with the transcoder module, the formatting module configured to instruct the transcoder module as to which of the plurality of heterogeneous sources to present in which one of the plurality of video containers, and as to the form of the presentation on the display device of each of the plurality of video containers in response to user commands from a network computing device separate from the display device and comprising at least one of a tablet computer and a smartphone in communication with the formatting module, wherein the network computing device has a touch screen interface that displays a representation of the plurality of video containers as arranged on the display device and which is configured to receive touch screen command inputs from a user to control, in near real time, the size, position, and access to the content of each of the plurality of video containers; and a streaming module in communication with the transcoder module and the communications network, the streaming module configured to receive the formatted video signal output from the transcoder module, and to output the video signal as a streaming data output to the display device.

5. The video container system of claim 4 wherein the formatting module is configured to resize the content of the plurality of heterogeneous video sources to display within the associated plurality of video containers.

6. The video container system of claim 4 further comprising a plurality of audio devices, each in communication with the media processing unit, each of the plurality of audio devices configurable to select and provide an audio output of a video content from one of the plurality of video containers, the audio device capable of changing the audio output to correspond to any one of the plurality of video containers in near real-time.

7. The video container system of claim 4, wherein a video container further includes one or more of the properties for filtering video content selected from the group including container type, list of channels with location, point of sale data, and permissions for viewer log-in.

8. The video container system of claim 4 further comprising a data storage module in communication with the media processing unit wherein the data storage module is configured to store a quantity of viewer data relating to one or more users.

9. The video container system of claim 4 further comprising an advertising module, the advertising module being in communication with the media processing unit, and outputting a signal comprising a video container comprising advertisement video.

10. The video container system of claim 9 wherein the advertisement video is synchronized with at least one of the plurality of video content displayed in the plurality of video containers.

11. The video container system of claim 4 further comprising an input module, the input module configured to receive an input from a user responding to an interactive video content output by the streaming module, the input module in communication with the communications network and media processing unit.

12. A method of providing output of a plurality of video content for presentation on a display device, the method comprising:

receiving a plurality of video, graphics, and internet content from a plurality of heterogeneous sources into a transcoder module, the transcoder module configured to receive, interpret and combine the plurality of content from the plurality of heterogeneous sources to generate and output a single video output signal, the video output signal comprising a plurality of video containers, each of the plurality of video containers comprising one of the plurality of video content and displayable with variable size and position on a display device under the control of a user wherein each of the plurality of video containers is capable of simultaneously displaying video content independent of the size, position and video content of the other of the plurality of video containers, and is capable of being sized without regard to an aspect ratio of the content received from the corresponding content source;

receiving a formatting command into a formatting module, the formatting command being received over a communications network from the user in response to user commands to a network computing device separate from the display device, comprising at least one of a tablet computer and a smartphone, wherein the network computing device has a touch screen interface that displays a representation of the plurality of video containers as arranged on the display device and is configured to receive touch screen command inputs from a user to control, in near real time, the size, position, and access to the content of each of the plurality of video containers;

transmitting a signal from the formatting module to the transcoder module, the signal instructing the transcoder module of which of the plurality of video streams to present in each of the plurality of video containers, and instructing the transcoder module of the proper format of the plurality of video containers;

receiving the video output signal from the transcoder module by a streaming module; and outputting the video output signal by the streaming module, the streaming module outputting the video output signal in a streaming data format to a communications network.

13. The method of claim 12 further comprising the steps of:

providing a social interface, the social interface allowing communication between a first user and a second user; and providing a video container transfer module, the video container transfer module allowing the first user to share a video content of one of the plurality of video containers with the second user.

14. The video display system of claim 1, wherein the video content of two or more of the plurality of video containers is related.

15. The video display system of claim 1, wherein the displayed video containers may be positioned and repositioned in near real-time.

16. The video display system of claim 1, wherein the content of a given video container continues to be responsive to interactions with the content source providing the source content.

17. The video display system of claim 1, wherein the video containers are logical containers capable of manipulating heterogeneous source content with arbitrary size and shape.

18. The video display system of claim 17, wherein the plurality of video containers have one or more of the unique properties of container type, content filters, list of channels with location, point of sale data, and permissions for viewer log-in.

19. The video display system of claim 1 wherein the display device is multiple display devices.

20. The video display system of claim 19 wherein the multiple display devices display different portions of the output video signal.

21. The video container system of claim 4 wherein the formatting module is configured to format the plurality of video containers by changing a plurality of video content in the plurality of video containers.

22. The video container system of claim 4 wherein the formatting module is configured such that the displayed video containers communicate programmatically or via user interaction with one or more other displayed video containers.

23. The video container system of claim 22 wherein the video content of two or more of the plurality of video containers is related and the formatting module is configured such that commands from a remote controller with respect to one of the plurality of related video containers results in changes to two or more of the plurality of video containers with related video content.

24. The video container system of claim 23 wherein the video content of the related video containers is from more than one of the plurality of heterogeneous sources.

25. The video container system of claim 4 wherein one of the plurality of video content comprises a live entertainment network broadcast, and wherein another one of the plurality of video content comprises a live internet video broadcast.

26. The video container system of claim 25 wherein the video content of one of the related video containers comprises an advertisement video.

27. The video display system of claim 1, wherein one of the plurality of heterogeneous content sources comprises a video game video source.

28. The video display system of claim 1, further wherein each video container is capable of being positioned on the display device without regard to a respective position of the other of the plurality of video containers.

29. A video display system comprising:
a computerized media processing unit configured to receive at least a plurality of content including at least one of video, audio, graphics, and internet content from a plurality of heterogeneous content sources providing such content and configured to combine the plurality of content from the plurality of content sources to generate and output a single video signal receivable by a display device;
wherein the video signal output by the media processing unit comprises a plurality of video containers all displayable on the display device simultaneously with variable size and position under the control of a user, wherein each of the plurality of video containers is capable of simultaneously displaying video content independent of the size, position, and video content of the other of the plurality of video containers, and is capable of being positioned on the display device without regard to a respective position of the other of the plurality of video containers; and
a network computing device separate from the display device and comprising at least one of a tablet computer and a smartphone in communication with the media processing unit, wherein the network computing device is configured to receive touch screen command inputs including a pinch gesture and a drag and drop gesture from a user to control the size, position, and access to the content of each of the plurality of video containers.

30. The video display system of claim 1, wherein the touch screen command inputs include a pinch gesture and a drag and drop gesture to control the size and position of the plurality of video containers on the display device.

31. The video display system of claim 1, wherein the computerized media processing unit comprises reconfigurable hardware configured to combine the plurality of content from the plurality of content sources.

32. The method of claim 12, wherein the touch screen command inputs include a pinch gesture and a drag and drop gesture to control the size and position of the plurality of video containers on the display device.

* * * * *